Dec. 27, 1966   F. F. CARN   3,294,963
DAY AND NIGHT AIMING DEVICE FOR WEAPONS
Filed March 12, 1964
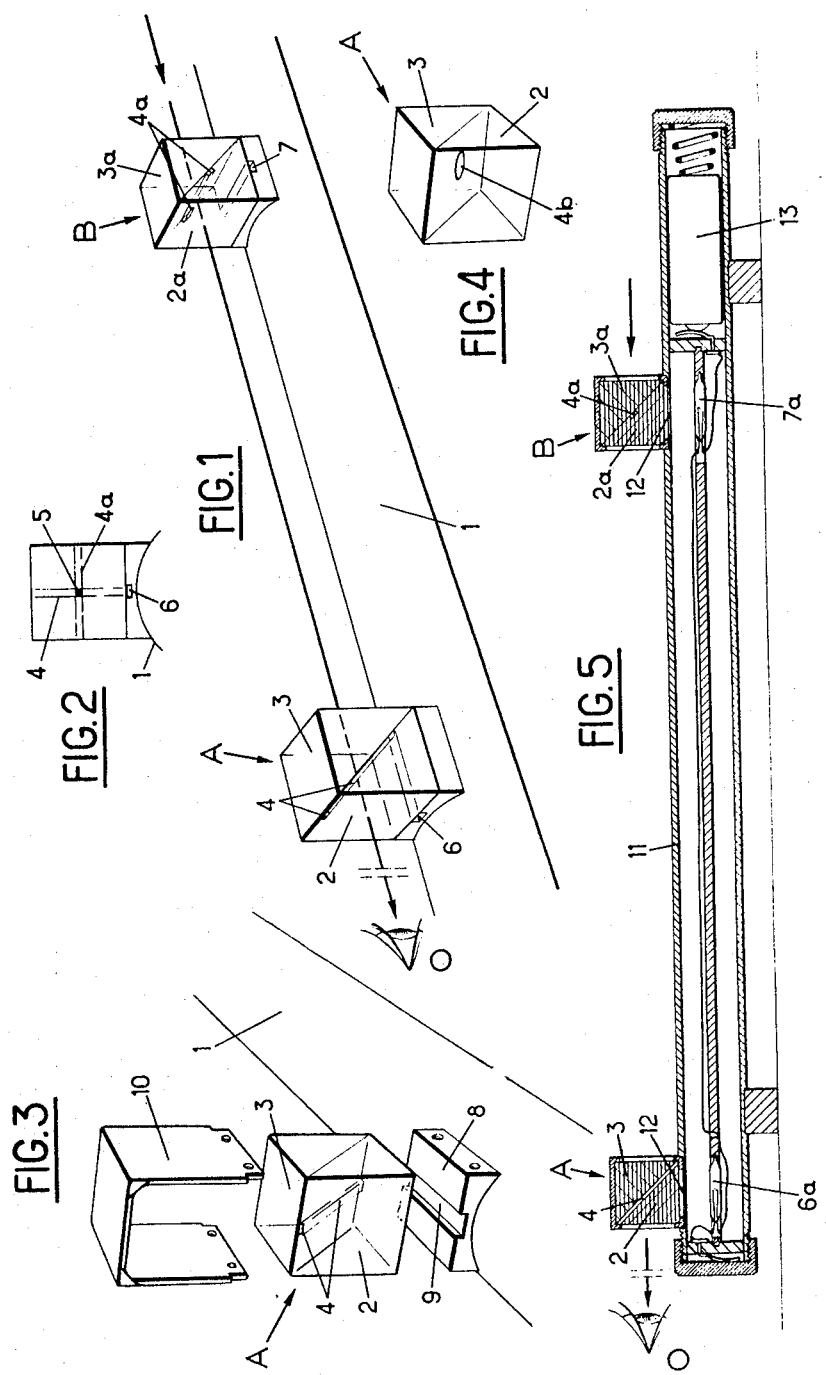
Inventor
FELIX F. CARN
By
Holcombe, Wetherill + Brisebois
Attorneys

United States Patent Office 3,294,963
Patented Dec. 27, 1966

3,294,963
DAY AND NIGHT AIMING DEVICE
FOR WEAPONS
Félix Francis Carn, 8 Rue Copernic, Paris 16, France
Filed Mar. 12, 1964, Ser. No. 351,492
Claims priority, application France, Mar. 15, 1963,
928,198, Patent 1,393,987
7 Claims. (Cl. 240—6.41)

The present invention has for its object a novel day and night aiming device intended for weapons, observation and measuring instruments and various other applications, said device being essentially characterized by the fact that it comprises two blocks of transparent material, for instance two cubes of "Lummer," mounted either on a separate support, or integral with the weapon or the observation or measuring instrument, each of said blocks having a mark of appropriate tracing, for instance a line of sight, whose precise alignment may be realized either at the step of assembly—once and for all—or after their assembly, as desired, by means of an adjustable device therefor; said marks—whose intersection or coincidence materializes the line of sight of said weapon or observation or measuring instrument—are illuminated at night, either by means of a permanently luminescent material located at any appropriate location on the mount of said transparent blocks—said luminescence being invisible in daytime, or by electrical means, for instance by dry cell fed lamps or bulbs.

The above mentioned characteristics will be better understood in the course of the following description, with reference to the annexed drawings. On said drawings:

FIGS. 1 and 2 are schematic views explaining the main features of the invention;

FIG. 3 is an exploded perspective view illustrating one embodiment of a transparent block embodying the invention;

FIG. 4 shows a transparent block whose mark is different from the mark of the preceding figures;

FIG. 5 represents an embodiment of the invention including electrical illumination.

Referring now to FIG. 1, one may see, aligned on support 1, two cubes of "Lummer," generally referenced A and B, said cubes being formed by the joining, side by side, as well known, of two total reflection prisms 2 and 3, whose bases are isosceles right-angled triangles.

As above stated, the alignment of the cubes, which must be essentially precise, may be realized either during the step of assembly thereof, or at the time of utilization of the device, through means which have not been represented.

In the embodiment shown on FIG. 1, a straight shallow recess or groove 4 is provided in prism 2, following its plane of junction with prism 3 and parallel with the side faces of block A, while, for block B, a recess or groove 4a, perpendicular to recess 4 is provided in prism 2a. The line of sight is materialized by the medial points 5 of the perpendicular recesses 4 and 4a.

FIG. 2 shows the cross-wire as seen by the operator while effecting a correct aiming, that is when he has brought the medial points 5 into coincidence.

For daytime aiming, the two recesses 4 and 4a appear in dark on a clear background.

For night aiming, two light sources, 6 and 7, are respectively disposed under blocks A and B.

Said light sources preferably comprise a self-luminescent material, creating no interference in the course of daytime aiming, for instance made of activated zinc sulphide.

The light beams from light sources 6 and 7, are in part diffused by recesses 4 and 4a and, in part, diffused towards the operator's eye O, by total reflection on the inner face of the cubes. The reflected light is sufficiently weak not to create any dazzling effects.

On the other hand, no light beam escapes through the front faces, which renders the device invisible from the front-side or target side.

The distance between cubes A and B is variable. The contrast between the illumination of the aiming lines and the background illumination both in daytime or night observation, allows a reduction of the distance between the two cubes and to realize compact devices, while keeping a sufficient precision.

Usually, as represented on FIG. 3, blocks A and B are advantageously mounted on a base 8 having a groove 9 receiving a readily replaceable luminescent load; the fixation and protection of the blocks may be simultaneously obtained by means of a cover part 10, fastened such as by screws or any other well-known means. It should be noted that the outlines 4 and 4a may be replaced by outline 4b as shown on FIG. 4, or by any other outline defining a line of sight.

The illumination of lines of sight 4, 4a and 4b may be obtained electrically, such as illustrated on FIG. 5. In that case, blocks A and B are mounted on a tube 11 which is affixed on the weapon or observation or measuring device in the manner of a sighting telescope. Colored screens 12 are interposed between the base of cubes A and B and the light sources comprised of miniaturized bulbs or lamps 6a and 7a, fed by a dry cell 13, whose energization is operated by an appropriate switch, not shown.

When the device is intended for a weapon, blocks A and B may be provided with elevation and drift scales.

One of the blocks may be placed on an elevation leaf sight, in the manner of a sighting notch or of a prop-sight. The directional corrections may be inscribed on said leaf sight.

It is to be understood that the above-described embodiments are in no way limitative and that all desirable modifications may be added thereto without departing from the scope of the invention.

For instance, the blocks may be provided with thermal insulation material and include means for affixing, in a removeable and exchangeable manner, an electrical light source or other appropriate illumination means.

It should be noted also that cubes A and B can be made parallelepipedic, through reduction of the length of those sides which are perpendicular to the plane of assembly of the prisms constituting said blocks.

It should be noted finally that the devices of the invention may be removably placed on shot guns or big-game rifles.

What I claim is:

1. A sighting device comprising two blocks of clear transparent material which exhibit the phenomenon of total light reflection at their surfaces, each block being provided with an elongated opening extending at least part way therethrough, means for mounting said blocks in alignment with each other, but spaced apart along a common axis, with said elongated openings extending in different directions across said axis, and means for introducing light into each block, so that it will be reflected at the surfaces surrounding said elongated openings, thereby rendering said openings visible.

2. A device as claimed in claim 1 in which each block is composed of two prisms the largest surfaces of which are transparently cemented together and said openings are channels in the largest surfaces of the prism of each pair mounted to be nearest the eye of the user.

3. A device as claimed in claim 2 in which said blocks are cubes and said prisms are half cubes having two square, two triangular and one rectangular face.

4. A device as claimed in claim 1 in which said means for introducing light are blocks of luminescent material positioned in said mounting means.

5. A device as claimed in claim 1 in which said means for introducing light comprises a pair of electric lamps positioned in said mounting means.

6. A device as claimed in claim 1 in which said mounting means is adjustable to permit variation of the spacing between said blocks.

7. A device as claimed in claim 1 in which each means for introducing light comprises an elongated member for each block occupying the same plane as the opening in said block.

References Cited by the Examiner

UNITED STATES PATENTS

| | | | |
|---|---|---|---|
| 673,985 | 5/1901 | Hollister | 240—6.41 |
| 1,346,303 | 7/1920 | Dawson et al. | 33—52 |
| 2,181,081 | 11/1939 | Ganaway | 33—52 X |
| 2,261,978 | 11/1941 | Dirckson | 240—6.41 X |
| 2,553,540 | 5/1951 | Beckerman | 33—52 X |

NORTON ANSHER, *Primary Examiner.*

CHARLES C. LOGAN II, *Assistant Examiner.*